Figure 1:
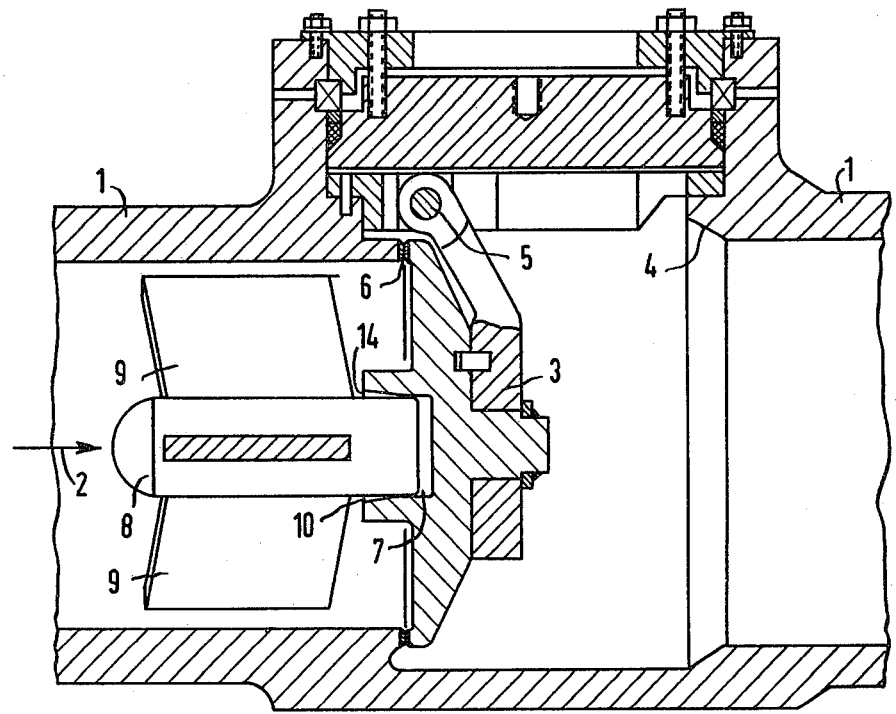

United States Patent [19]
Hoffmann et al.

[11] 4,315,524
[45] Feb. 16, 1982

[54] DAMPING DEVICE FOR CHECK VALVES

[75] Inventors: Jürgen Hoffmann, Erlangen; Werner Eck, Herzogenaurach, both of Fed. Rep. of Germany

[73] Assignee: Kraftwerk Union Aktiengesellschaft, Mülheim, Fed. Rep. of Germany

[21] Appl. No.: 177,717

[22] Filed: Aug. 13, 1980

[30] Foreign Application Priority Data

Aug. 16, 1979 [DE] Fed. Rep. of Germany ....... 2933201

[51] Int. Cl.³ ............................................. F16K 15/03
[52] U.S. Cl. .................................. 137/514.3; 137/514.5
[58] Field of Search .................. 137/514, 514.3, 514.5, 137/514.7

[56] References Cited

U.S. PATENT DOCUMENTS

| 505,238 | 9/1893 | Smith | 137/514.5 X |
|---|---|---|---|
| 2,289,946 | 7/1942 | Weatherhead | 137/514.3 |
| 3,141,471 | 7/1964 | Williamson | 137/514.7 X |
| 3,265,060 | 8/1966 | Schreiber | 137/514 |

FOREIGN PATENT DOCUMENTS

| 167996 | 11/1904 | Fed. Rep. of Germany | 137/514.3 |
|---|---|---|---|
| 7114268 | 8/1973 | Fed. Rep. of Germany | |
| 2736080 | 2/1979 | Fed. Rep. of Germany | 137/514 |

*Primary Examiner*—Robert G. Nilson
*Attorney, Agent, or Firm*—Herbert L. Lerner; Laurence A. Greenberg

[57] ABSTRACT

Damping device for a check valve in a pipeline traversible by a liquid, the check valve having a closure member movable by flow of the liquid into a position wherein it lies on a valve seat in the pipeline so as to close the valve, the damping device including at least two parts of which a first part is a cylinder and a second part a piston reciprocatingly received in the cylinder, one of the first and second parts being connected to the closure member and the other of the first and second parts being connected to the valve seat, the cylinder including means defining a depression closed at one end thereof and open at the opposite end thereof, the piston including a plunger substantially matching the cross section of the depression and disposed so as to project into the open end of the depression shortly before the closure member has reached the position thereof wherein the valve is closed, the outer surface of the plunger and the defining surface of the depression being so formed as to define a gap narrowing down during closing movement of the closure member.

3 Claims, 2 Drawing Figures

DAMPING DEVICE FOR CHECK VALVES

The invention relates to a damping device for check valves in pipelines traversible by liquid, the check valve having a closure member movable by flow of the liquid into a position wherein it sits on a valve seat so as to close the valve, the damping device comprising a cylinder and a piston, one of which is connected to the closure member and the other to the valve seat.

Such a damping device has already been described in German Petty Patent (DE-GM) No. 7 114 268 for a check valve with an additional auxiliary valve wherein an auxiliary valve is inserted into a check valve in which a movable closure member is connected to a piston. This piston is resiliently mounted in a cylinder, the cylinder chamber of which communicates with the interior of the pipeline through a throttle bore. When closing the valve, the liquid flowing back forces the closure member with the piston into the cylinder and squeezes the liquid enclosed therein out through the throttle bore. A damped motion of the closure member is thereby achieved.

It is accordingly an object of the invention to provide a damping device for a check valve which is of especially simple construction, has high operational reliability and ensures progressive damping shortly before the closing position of the closure member is reached. Especially for installation in nuclear installations, considerable advantages are obtained over heretofore known complicated check valves due to the high operational reliability of the damping device according to the invention.

With the foregoing and other objects in view there is provided, in accordance with the invention, a damping device for a check valve in a pipeline traversible by a liquid, the check valve having a closure member movable by flow of the liquid into a position wherein it lies on a valve seat in the pipeline so as to close the valve, the damping device comprising at least two parts of which a first part is a cylinder and a second part a piston reciprocatingly received in the cylinder, one of the first and second parts being connected to the closure member and the other of the first and second parts being connected to the valve seat, the cylinder comprising means defining a depression closed at one end thereof and open at the opposite end thereof, the piston comprising a plunger substantially matching the cross section of the depression and disposed so as to project into the open end of the depression shortly before the closure member has reached the position thereof wherein the valve is closed, the outer surface of the plunger and the defining surface of the depression being so formed as to define a gap narrowing down during closing movement of the closure member.

In accordance with another feature of the invention, the depression is in the form of a blind bore in the closure member, and support plates are provided securing the plunger to the pipeline wherein the valve seat is carried.

In accordance with a concomitant feature of the invention, the damping device includes an hydrodynamic body secured to the pipeline and the valve seat and spaced from the closure member, the hydrodynamic body being formed with the depression, and the plunger being rigid with the closure member and being movable therewith.

Other features which are considered as characteristic for the invention are set forth in the appended claims.

Although the invention is illustrated and described herein as embodied in a damping device for check valves, it is nevertheless not intended to be limited to the details shown, since various modifications and structural changes may be made therein without departing from the spirit of the invention and within the scope and range of equivalents of the claims.

Figure 2:
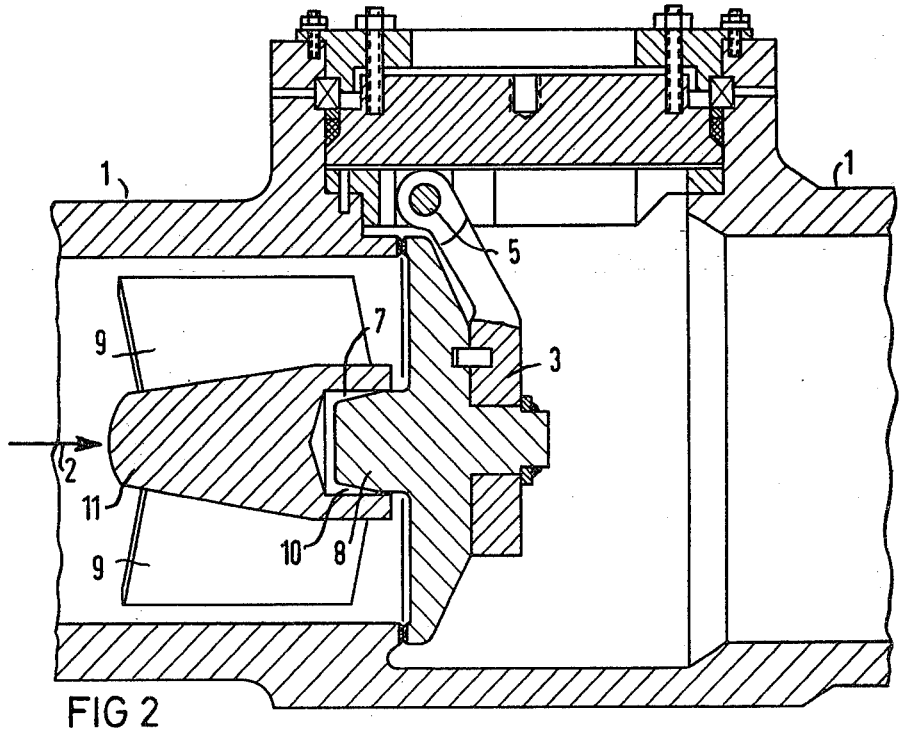

The construction and method of operation of the invention, however, together with additional objects and advantages thereof will be best understood from the following description of specific embodiments when read in connection with the accompanying drawings, in which:

FIGS. 1 and 2 are longitudinal sectional views of different embodiments of the damping device for check valves constructed in accordance with the invention.

Referring now to the drawing and first, particularly, to FIG. 1 thereof, there is shown an arrangement wherein a closure member 3 is formed with a depression 7, and a plunger 8 is secured within and to a pipe line 1 which is formed with a valve seat 6.

In the arrangement in FIG. 2, the plunger 8 is fastened to the closure member 3 and the depression 7 is formed in a member 11 secured to the pipe line 1 carrying the valve seat 6. In the pipe line 1, a liquid flows normally in direction of the arrow 2. The closure member 3, which is shown closed in FIG. 1, is then opened and engages the edge 4 of the pipeline 1. When the flow is reversed in the pipeline 1, the closure member 3 is moved into the closing position thereof shown in FIG. 1. In the process of doing so, it turns about the shaft 5 until it comes into contact with the valve seat 6 provided on the pipeline 1. To damp this closing motion shortly before the closing position of the closure member 3 is reached, the latter is formed with a cylindrical depression 7 provided as a blind bore in FIG. 1. This depression 7 acts like the cylinder in the aforementioned heretoforeknown damping device. Instead of a cylindrical cross section, other cross-sectional shapes, such as a hollow-cylindrical or tubular cross section, for example, can be used. The plunger 8 acts as a damper piston cooperating with the depression 7, the cross section of the plunger 8 being matched to that of the depression 7. The plunger 8 is firmly connected to the pipeline 1 by means of support plates 9. The pipeline 1 suitably carries the valve seat 6 on a shoulder thereof. In the embodiment according to FIG. 1, the depression 7 flares conically toward the open end 8. When the plunger 8 is introduced into the depression 7, a gap 10 is thereby formed which continuously narrows down toward the closing position of the closure member 3. Water or other fluid enclosed in the depression 7 must be forced thereby through the gap 10. The cross section of this gap 10 determines how progressively the damping device operates. The conical expansion or widening of the depression 7 simultaneously ensures guidance between the depression 7 and the plunger 8, so that the plunger 8 reliably extends into the depression 7 during each closing operation even if there is a difference in temperatures and even when bearing play, which cannot be excluded, exists at the shaft 5.

Like parts in FIGS. 1 and 2 are provided with the same reference characters. The embodiment of FIG. 2 differs from that of FIG. 1 in that the plunger is secured to or integral with the closure member 3 in FIG. 2, while the support plates 9 support a hydrodynamic or flow body 11 into which the depression 7 is machined. In the embodiment of FIG. 2, the gap 10 between the plunger 8 and the depression 7 is formed by the conical construction of the plunger 8.

An especial advantage of the inventive arrangement according to the embodiment of FIG. 1 is that the plunger 8 can have a smaller cross section than the hydrodynamic body 11 of FIG. 2.

There are claimed:

1. Damping device for a check valve in a pipeline traversible by a liquid, the check valve havng a closure member pivotable by flow of the liquid into a position wherein it it lies on a valve seat in the pipeline so as to close the valve, the damping device comprising at least two parts, of which a first part is a cylinder and a second part a piston reciprocatingly received in said cylinder, one of said first and second parts being connected to the closure member and the other of said first and second parts being connected to the valve seat, said cylinder comprising means defining a depression closed at one end thereof and open at the opposite end thereof, said piston comprising a plunger substantially matching the cross section of said depression and disposed so as to project into said open end of said depression shortly before the closure member has reached the position thereof wherein the valve is closed, the outer surface of said plunger and the defining surface of said depression being so formed as to define a gap narrowing down during closing movement of the closure member, and including substantially radially extending support plates securing said other of said first and second parts to the pipeline carrying said valve seat, said other of said first and second parts being an elongated member disposed substantially coaxially with the pipeline, said one of said first and second parts being movable together with the closure member into the position wherein the closure member lies on the valve seat in the pipeline so as to close the valve, said one of said first and second parts, in said closed position of the valve, being disposed coaxially with said other of said first and second parts and the pipeline.

2. Damping device according to claim 1 wherein said depression is a blind bore substantially centrally formed in the closure member, and said other of said first and second parts comprises said plunger.

3. Damping device according to claim 1 wherein said other of said first and second parts comprises a hydrodynamic body secured by said support plates to said pipeline and said valve seat and spaced from the closure member, said hydrodynamic body being formed with said depression, and said plunger being rigid with the closure member and being movable therewith.

* * * * *